F. M. RAY.
Carriage-Spring.
No. 25. Reissued Sept. 25, 1840.
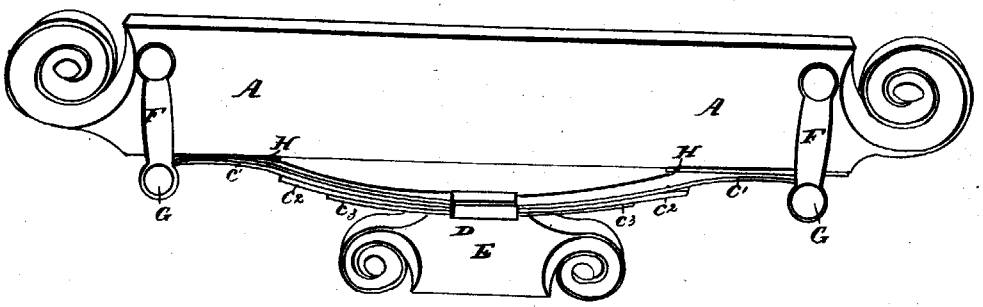
N. PETERS, PHOTO-LITHOGRAPHER, WASHINGTON, D. C.

UNITED STATES PATENT OFFICE.

FOWLER M. RAY, OF CATSKILL, NEW YORK.

IMPROVED SPRING FOR RAILROAD-CARS.

Specification forming part of Letters Patent No. 1,000, dated November 3, 1838; Reissue No. 25, dated September 25, 1840.

*To all whom it may concern:*

Be it known that I, FOWLER M. RAY, of Catskill, in the county of Greene and State of New York, have invented a new and useful Improvement in the Manner of Constructing Springs for Railroad-Cars, Locomotives, and other Carriages; and I do hereby declare that the following is a full and exact description thereof.

I construct my springs of several leaves of spring-steel gradually decreasing in length, as in other car and carriage springs; but I do not allow the ends of either of the successive leaves to come into contact with its adjoining longer leaf, excepting when forced to do so by the pressure of the load, by which manner of constructing and combining the several leaves I render my springs self-adjusting, the leaves sustaining each other in proportion to the load which is placed upon them.

In the accompanying drawing, A A represent a part of the side rail of the frame of a railroad-car, locomotive, or other carriage, against the under side of which the ends of the spring C C are made to bear. The upper leaf, C′ C′, of this spring, as represented in the drawing, has its outer ends made to bend around bolts G G, passing through shackles or links F F swinging on bolts passing through the side rail, A A, thus allowing a free motion to the leaf endwise as it lengthens or stortens.

Instead of the shackles F F to sustain the leaf C′ C′, the ends of said leaf may pass into pockets on the under side of the rail, or may be secured thereto in any other of the known modes admitting the requisite play to the springs. There are plates of iron or of steel affixed at H H to the under side of the rail, as bearings for those parts of the spring which are to come into contact with them. The leaves $C^2$ and $C^3$, together with such others as it may be thought proper to use, are connected with the leaf C′, and with each by means of a band and bolt at their centers D, by which, also, they may be fastened to the block E or to any other fixture adapted to sustain them, and to connect them with the axle-boxes or other parts of the carriage. The ends of the leaves $C^2$ and $C^3$, it will be seen, stand off from the leaves next above them, and this they may do for nearly their whole length when they are unloaded; but they are so bent that when heavily loaded they will touch along their whole length, their points of contact being in proportion to the load placed upon them. A similar action is exerted also on the leaf C′ C′, its points of bearing upon the plates H H approaching each other in proportion to the load, while the elastic force of the ends of this leaf without the points of direct bearing is still rendered effective by the action of its ends downward on the bolts G G, or on the pockets or other substitutes for them.

Having thus fully explained the nature of my improvement in the springs for railroad-cars, locomotives, and other carriages, what I claim therein as constituting my invention, and desire to secure by Letters Patent, is—

The manner in which I construct, arrange, and combine the respective leaves of which they are composed, as set forth, so that when lightly loaded said leaves shall not touch each other toward their outer ends, while they shall be brought into complete contact when heavily loaded, the extent of such contact being regularly proportioned to the load.

In testimony whereof I hereunto set my name this 26th day of August, 1840.

FOWLER M. RAY.

Witnesses:
THOS. P. JONES,
GEORGE WEST.